(12) United States Patent
Tanaka et al.

(10) Patent No.: US 6,532,933 B1
(45) Date of Patent: Mar. 18, 2003

(54) FUEL INJECTION STRATEGY FOR FOUR CYCLE ENGINES

(75) Inventors: Daijirou Tanaka; Uichitake Uchiyama, both of Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/526,283

(22) Filed: Mar. 15, 2000

(30) Foreign Application Priority Data

Mar. 15, 1999 (JP) .......................................... 10-067654

(51) Int. Cl.[7] .................................................. F02B 5/100
(52) U.S. Cl. ........................................ 123/305; 123/298
(58) Field of Search ................................... 123/298, 305

(56) References Cited

U.S. PATENT DOCUMENTS

| | | | |
|---|---|---|---|
| 5,775,288 A | * | 7/1998 | Suzuki et al. ............... 123/298 |
| 5,775,289 A | | 7/1998 | Yoshida et al. |
| 5,806,473 A | | 9/1998 | Kometani et al. |
| 5,865,153 A | | 2/1999 | Matsumoto |
| 5,941,210 A | * | 8/1999 | Hill et al. .................... 123/298 |
| 5,979,400 A | * | 11/1999 | Nishide ....................... 123/305 |
| 5,996,552 A | * | 12/1999 | Iijima et al. ................. 123/305 |
| 6,125,816 A | * | 10/2000 | Inoue .......................... 123/295 |

* cited by examiner

Primary Examiner—John Kwon
(74) Attorney, Agent, or Firm—Knobbe, Martens, Olson & Bear, LLP

(57) ABSTRACT

The invention includes a combustion chamber and an injection strategy for a direct fuel injected internal combustion engine. The combustion chamber is formed with a substantially flat surface to provide a large surface area on which fuel can collect and evaporated. At high loads, fuel is injected into the combustion in two stages. The first stage starts before top-dead center and stops before a prohibited range where smoke is produced. The second stage starts after the prohibited range and stops approximately when the intake valve is at its maximum lift.

41 Claims, 7 Drawing Sheets

FUEL INJECTION STRATEGY FOR FOUR CYCLE ENGINES

PRIORITY INFORMATION

This application is based on and claims priority to Japanese Patent Application No. 11-067654, filed Mar. 15, 1999, the entire contents of which is hereby expressly incorporated by reference.

BACKGROUND OF THE INVENTION

1. Field of the Invention

The present invention relates to fuel injected engines and, in particular, to an improved combustion chamber design and injection timing strategy for a fuel injected engine.

2. Description of the Related Art

There are two general categories of fuel supply systems for internal combustion engines. One type of fuel system utilizes a carburetor, which delivers a generally constant air/fuel ratio during a given intake cycle. The other type of fuel system utilizes fuel injection, which delivers a finite amount of fuel to the engine generally once per combustion cycle. Typically, in a fuel injected engine, the fuel is either injected into the induction system or injected directly into the combustion chamber. The later method is generally referred to as direct fuel injection.

The current trend in the industry is to use direct fuel injection to improve performance, emissions and fuel economy. One of the advantages of direct fuel injection is that the charge in the combustion chamber can be stratified. That is, the fuel can be directed towards the spark plug such that the fuel/air mixture is rich around the spark plug gap. Accordingly, the engine can be run at an overall leaner fuel/air ratio. This reduces the amount of unburned hydrocarbons in the exhaust and increases fuel economy.

To obtain more effective stratification in the combustion chamber, the piston head typically includes a bowl that is offset towards one side of the combustion chamber. This arrangement encourages a "tumble flow" of fuel and air from the bowl into the area where the spark gap exists. Such an arrangement enhances the rich conditions around the ignition area.

There are, however, several problems associated with conventional direct fuel injected engines. For example, at high-speed and high-load conditions, a large volume of gasoline must be injected into the combustion chamber. Accordingly, the injection of fuel must be advanced (i.e., with respect to the spark plug firing) so that the fuel has sufficient time to vaporize and mix with the air. However, such advanced fuel injection tends to produce smoke in the exhaust discharge.

There are typically two types of smoke in the exhaust discharge. White exhaust smoke comprises tiny droplets of liquid that are made up of mainly fuel and water. White exhaust smoke typically occurs during cold starts and/or when there is poor vaporization of the liquid fuel. These fuel droplets remain unburnt after the combustion process and are discharged through the exhaust. Black exhaust smoke is formed when fuel is subjected to rich conditions. During such conditions, the hydrogen molecules of the fuel are preferentially oxidized. The remaining carbon atoms are difficult to burn and thus remain unburnt after the combustion and are discharged as particulates with the discharge gases.

Accordingly, there is a need for an improved fuel injected engine that reduces the amount of exhaust smoke at high engine speeds and loads.

SUMMARY OF THE INVENTION

One aspect of the present invention includes the recognition that the exhaust smoke, which is typically associated with direct fuel injection at high speeds/loads, is caused in part by high fuel densities. High fuel densities in the combustion chamber can produce black exhaust smoke as hydrogen molecules of the fuel are oxidized preferentially. High fuel densities also inhibit the vaporization of the fuel, which can produce white exhaust smoke. Poor fuel vaporization can also impair cooling of the intake air, which can lead to engine knock. These problems are particularly present when fuel is injected into the combustion chamber at a crankangle of 10–40 degrees past top-dead center during the start of the intake stroke. Accordingly, it is desirable to start fuel injection after this range of crankangles that correspond to a "exhaust smoke zone".

At high speeds/loads, however, a large volume of fuel must be injected into the combustion chamber. Accordingly, if fuel injection is delayed so that fuel injection starts after the exhaust smoke zone (e.g., approximately 40 degrees past top-dead center), then the fuel injection must continue until the intake stroke is almost complete. In such an arrangement, much of the fuel will be injected after the intake cam achieves its maximum lift. This is undesirable because the fuel injected after the intake cam achieves its maximum lift is not mixed as effectively. Accordingly, the quality of the combustion is reduced thereby reducing engine torque.

Accordingly, one aspect of the of the present invention involves an internal combustion engine that comprises an engine body assembly that defines at least one cylinder closed at one end, The engine further comprises at least one piston that reciprocates within the cylinder and at least one combustion chamber formed within the engine body assembly by the cylinder, the closed end of the cylinder and the piston. The piston has a head that faces the closed end of the cylinder. The piston is coupled to an output shaft such that movement of the reciprocating movement of the piston causes the output shaft to rotate. A fuel injector is arranged to supply fuel to the combustion chamber. The fuel injector includes an actuator to control a flow of fuel through the fuel injector. A fuel control system is coupled to the actuator and is configured to control the actuator so as to not inject fuel into the combustion chamber when the output shaft is within a prohibited shaft angle range that is located past a top-dead-center position.

Another aspect of the of the present invention involves an internal combustion engine that operates on a four-stroke cycle. The engine comprises an engine body assembly defining at least one cylinder closed at one end, a piston reciprocating within the cylinder, and at least one combustion chamber formed within the engine body assembly by the cylinder, the closed end of the cylinder and the piston. The piston has a head that faces at least one intake port and at least one exhaust port. The piston is coupled to an output shaft such that movement of the reciprocating movement of the piston causes the output shaft to rotate. An intake valve opens and closes during each cycle to regulate the flow of intake are into the combustion chamber. A fuel injector supplies fuel to the combustion chamber. The fuel injector includes an actuator to control a flow of fuel through the fuel injector. A fuel control system is coupled to the actuator and configured to inject fuel into the combustion chamber in at least a first stage and a second stage during each cycle. The first and second stages are separated by a rest period. The first and second stages are completed before the intake valve closes during each cycle.

Yet, another aspect of the present invention involve an internal combustion engine that operates on a four-stroke cycle. The engine comprises an engine body assembly defining at least one cylinder closed at one end, at least one piston reciprocating within the cylinder, and at least one combustion chamber formed within the engine body assembly by the cylinder, the closed end of the cylinder and the piston. The piston has a head that faces the closed end of the cylinder. The piston is coupled to an output shaft such that movement of the reciprocating movement of the piston causes the output shaft to rotate. A fuel injector supplies fuel to the combustion chamber. The fuel injector includes an actuator to control a flow of fuel through the fuel injector. A fuel control system is coupled to the actuator and configured to inject fuel into the combustion chamber before the piston reaches a top-dead-center position of an intake stroke.

Another aspect of the invention involves a method for operating an internal combustion. The method includes reciprocating a piston within a cylinder of the engine through power, exhaust, intake and compression strokes of repeating combustion cycles. The method also includes injecting fuel into a combustion chamber, which is formed within the cylinder, during a first injection stage during each cycle. The method further includes ceasing fuel injection during a rest period occurring within the intake stroke and injecting fuel into the combustion chamber during a second stage after the rest period.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

These and other features of the invention will now be described with reference to the drawings of a prior art combustion chamber design and of preferred embodiments, which are intended to illustrate and not to limit the invention. The drawings contain the following figures.

DETAILED DESCRIPTION OF THE PREFERRED EMBODIMENTS

Figure 1:
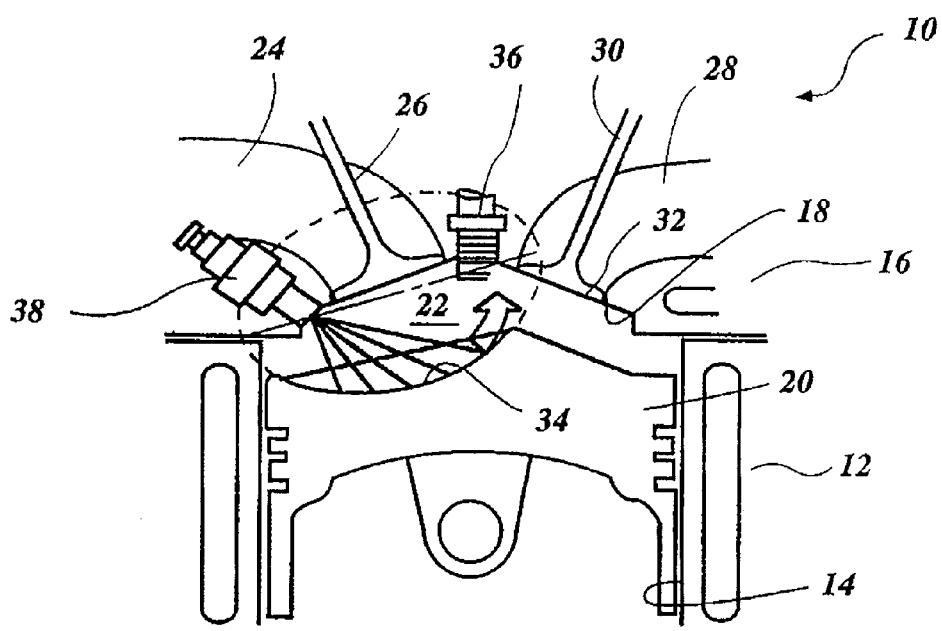
FIG. 1 is a partially schematic cross-sectional view taken through a single cylinder and piston of a prior combustion chamber.

In order to better understand the present invention, a conventional direct fuel injected engine 10 will be described first. As seen in FIG. 1, the engine 10 includes a cylinder block 12 in which a cylinder bore 14 is formed. A cylinder head 16 is affixed to the cylinder block 12 and closes the upper end of the cylinder bore 14. A lower surface of the cylinder head 16 defines a recess 18. A piston 20 reciprocates in the cylinder bore 14 and defines, with the recess 18, and the cylinder bore 14 a combustion chamber 22.

Air is delivered to the combustion chamber 22 though an intake passage or passages 24. The flow of air through the intake passage 24 is controlled by an intake valve 26. Exhaust gases exits the combustion chamber through an exhaust passage or passages 28. The flow of exhaust through the exhaust passage 28 is controlled by an exhaust valve 32.

The piston 20 includes a raised portion 32. An offset recess or bowl 34 is formed in a side of the piston 20. The bowl 34 faces the intake passage or passages 24.

A spark plug 36 is mounted in the cylinder head 16 such that its tip is positioned centrally in the cylinder bore 14. A fuel injector 38 also is mounted in the cylinder head 16 and is directed towards the base of the bowl 34. Furthermore, as shown in FIG. 1, the fuel injector 38 is designed to spray in relatively wide arc. Theoretically, this configuration of the fuel injector 38 and the bowl 34 creates a tumble flow that causes the fuel to deposit and move as schematically shown by the arrow in FIG. 1 towards the spark plug 36. Accordingly, the fuel/air ratio around the spark plug 36 is stoichiometric or rich even if the overall fuel air ratio is lean and/or when the engine 10 is operating at light loads.

To obtain the desired effects in the prior engine 10 described above, the fuel is typically injected late into the cycle when the piston 20 is approaching its top dead center (i.e., just before the spark plug 36 is fired). Accordingly, the fuel is in the combustion chamber 22 for a relatively short time before the spark plug 36 fires. Accordingly, there can be a substantial amount of unvaporized fuel in the combustion chamber 22 when the spark plug 26 fires. This can result in increased hydrocarbon emissions.

Figure 2:
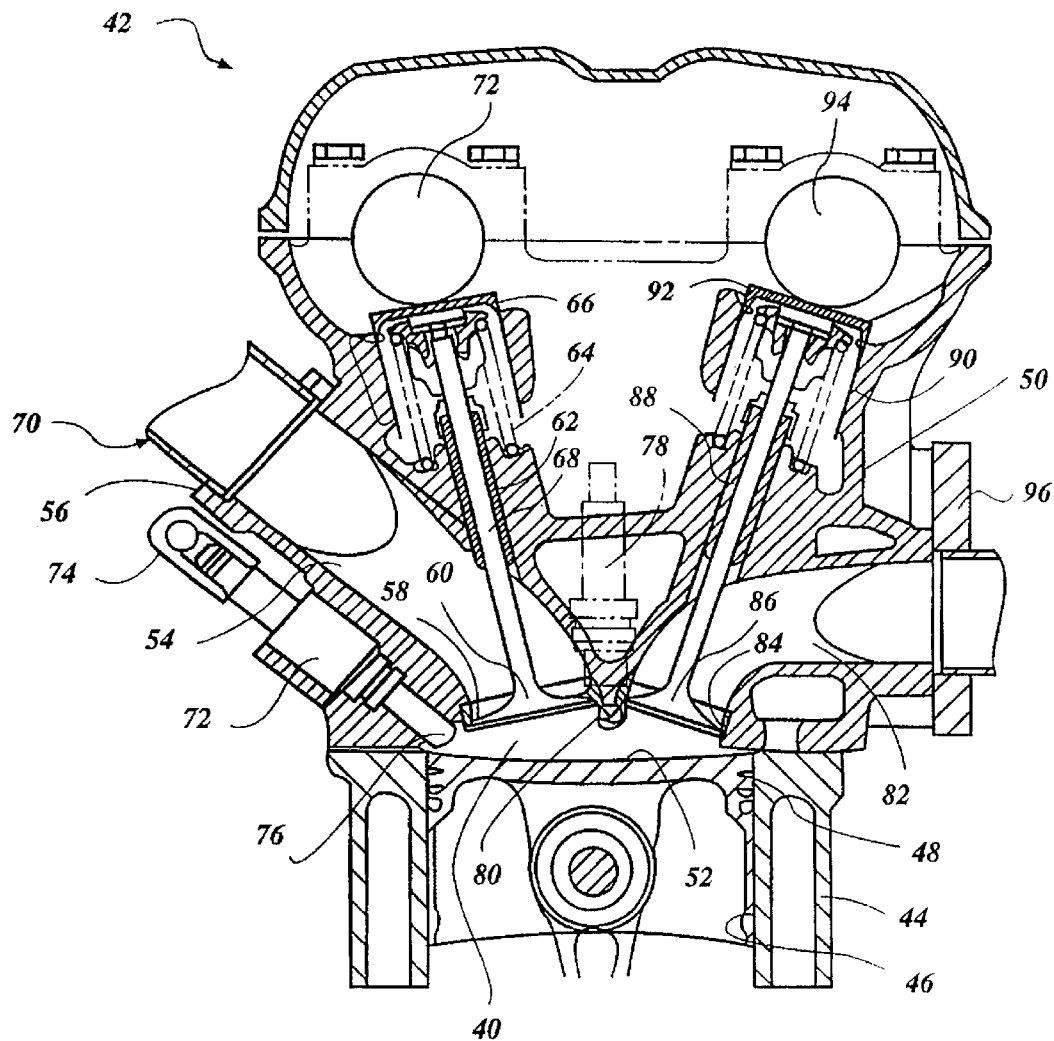
FIG. 2 is a partially cross-sectional view a taken through a single piston, cylinder and cylinder head constructed in accordance with an embodiment of the invention.
Figure 2A:
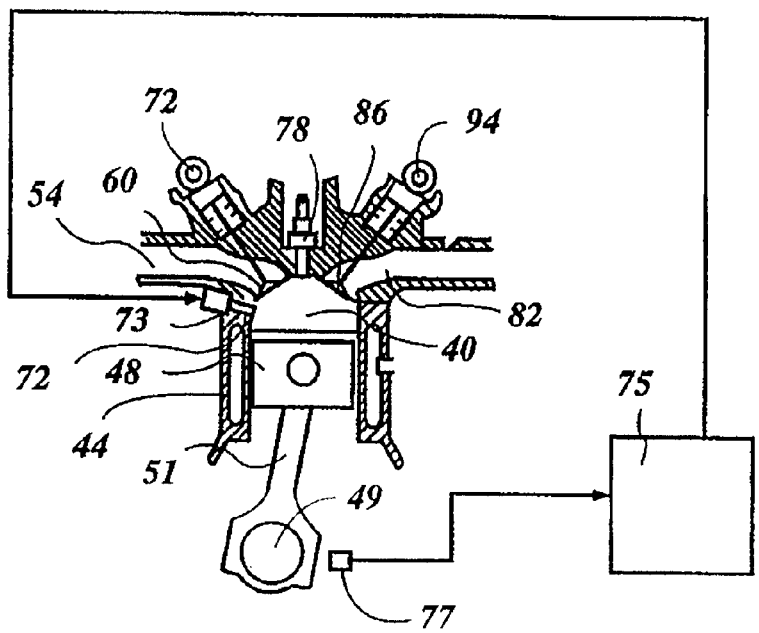
FIG. 2A is a partially cross-sectional view of the piston, cylinder, and cylinder head of FIG. 2 which also illustrates a crankshaft and a fuel control unit according to the present engine.
Figure 3:
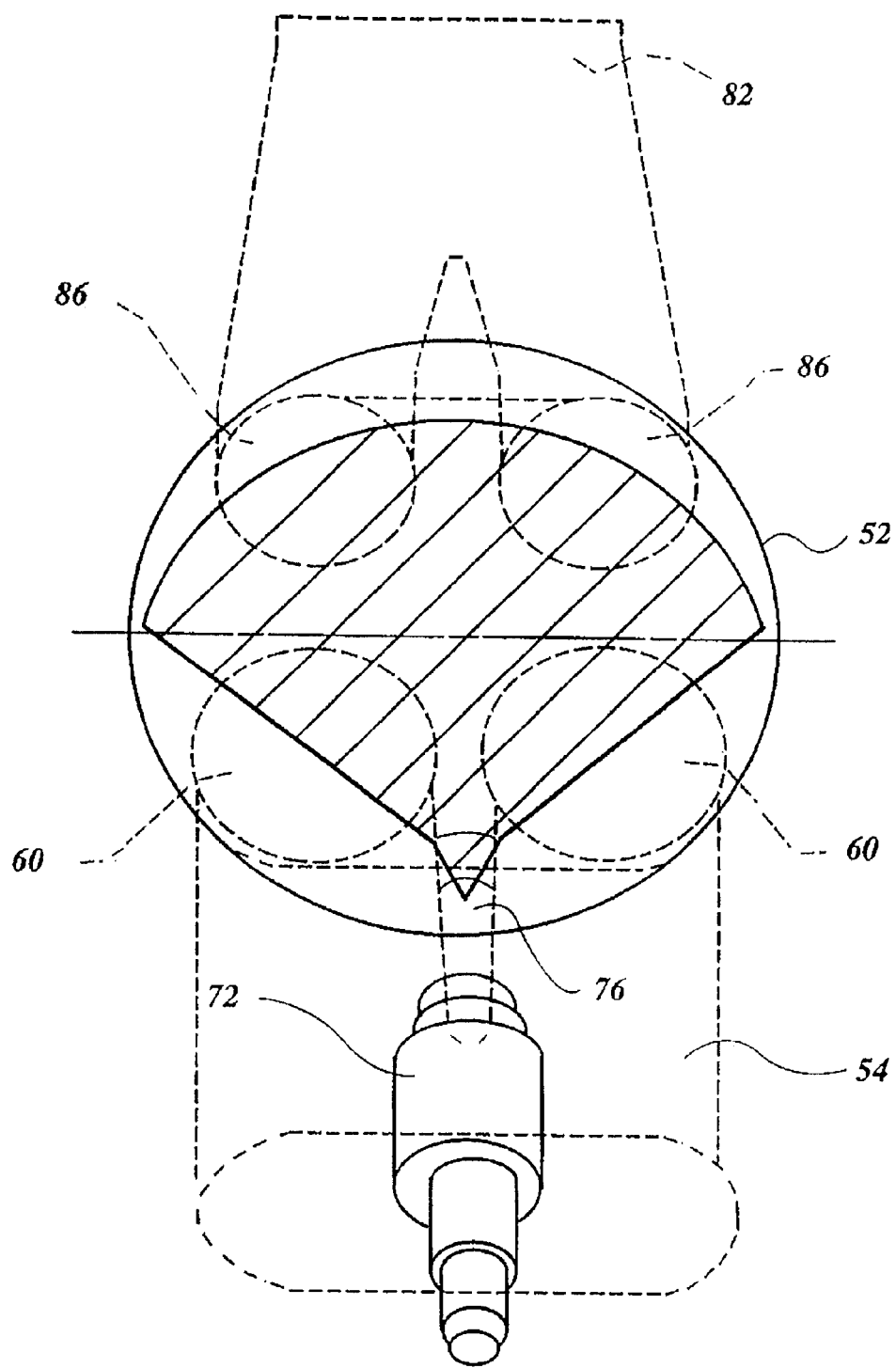
FIG. 3 is a schematic top plan view of the cylinder and cylinder head of FIG. 2 showing the combustion chamber and a fuel injector in solid lines and intake and exhaust passages in phantom lines so as to show the full details of the spray pattern from the fuel injector.

FIGS. 2, 2A and 3 illustrate a combustion chamber 40 of an engine 42 that is configured accordance with an embodiment of the present invention. Because the present engine deals primarily with the configuration of the combustion chamber 40 and the fuel injection timing strategy, only a portion of an engine 42 that forms the combustion chamber 42 is illustrated in the FIGS. 2 and 3. The remaining elements of the engine 42 that are not illustrated or described in detail may be considered to be conventional and are well known to those of ordinary skill in the art.

The engine 42 includes a cylinder block 44 having one or more cylinder bores 46 laid out in any desired pattern (e.g., v-type, opposed, etc.). A corresponding number of pistons 48 reciprocate within the cylinder bores 46. A cylinder head 50 is affixed in a known manner to the cylinder block 44. The combustion chamber 40 is defined by the a top surface 52 of the piston 48, the cylinder bore 46 and the cylinder head 50. As shown in FIG. 2A, a crankshaft 49 is connected to the pistons by a connecting rod 51 and rotates with reciprocal movement of the pistons 48 within the cylinder bores 46.

Preferably, in the illustrated embodiment, the top surface 52 of the piston 48 is substantially flat. More preferably, the top surface 52 is coated with a ceramic-like material. Coating the top surface 52 with a ceramic material insulates the remainder of the piston 48 from the heat of the combustion chamber 40 while still maintaining an elevated temperature on the head 52 of the piston 48. It should be noted that the piston 48 does not include a bowl for setting up a tumble flow.

The cylinder head 50 defines a pair of intake passages 54 that extend from openings in an outer surface 56 of the cylinder head 50 to intake valve seats or ports 58 located on the combustion chamber 40. The intake valve seats or ports 58 are valved by poppet-type intake valves 60.

The intake valves 60 have stem portions that are slidably supported in guides 62 that are fixed to and form a part of the cylinder head 50. Coil compression springs 64 engage the cylinder head 50 and a keeper retainer assembly 66 is fixed to a valve stem 68. These components urge the intake valves 60 to a closed position.

An induction system, which is shown partially and indicated by the reference number 70, supplies an intake charge to the intake passages 54. The induction system 70 may be of any known type. The induction system 70 may include throttle valves and flow controlling valves that are designed to engender either swirl, tumble, or a combination thereof to the combustion chamber 40. This may be done during all or portions of the induction cycle and during all or only certain running conditions.

An intake camshaft 72 is rotatably journaled within the cylinder head 50 in a suitable manner. This intake camshaft 72 is preferably driven at one-half crankshaft speed by a suitable timing drive. The intake camshaft 72 open and close the intake valves 42 as is well known in the art.

A fuel injector 72 preferably is mounted in the cylinder head 50 adjacent, below, and between the intake passages 54 as best seen in FIGS. 2 and 3. As seen in FIGS. 2 and 3, the intake passages 54 have generally straight portions which curve slightly toward the valve seats 58. The fuel injector 72 is disposed substantially parallel to the straight portions of the intake passages 54. Each fuel injector 52 receives fuel from any suitable fuel supply system. In the illustrated embodiment, the fuel injectors receive fuel from a fuel rail 74.

Each injector 72 has a nozzle tip 76. As shown in FIG. 2A, an actuator 73, such as, for example, a solenoid valve, opens and closes each of the injectors 72. A fuel control system 75 controls the actuator 73. The fuel control system determines the timing and duration of the fuel injection in response to a signal sent by a crank angle sensor 77. The fuel control system 75 can be in the form of a hard wired feed back control circuit. Additionally, the fuel control system 75 can be constructed of a dedicated processor and a memory for storing a computer program. Moreover, the fuel control system 75 can be a general purpose computer having a general purpose processor and memory for storing a computer program. It should also be noted that the fuel control system may be a subsystem of an engine control system (not shown). Additionally, the fuel control system 75 can include separate components or be entirely separate from the engine control system.

The injector nozzles 76 are preferably of the swirl type. The nozzles 76 also preferably inject fuel in a generally conical towards the piston head 52. At a certain point in the injection cycle (which will be described below), fuel will be directed towards the flat, top surface 52 of the piston 48 as is indicated by the shaded regions of FIG. 3. Accordingly, the fuel will be spread equally along the top surface 52 of the piston 48.

The fuel/air mixture in the combustion chamber 40 is fired by a spark plug 78. The spark plug 78 is preferably mounted in the cylinder head 50 so that its spark gap 80 is disposed substantially on a center axis of the cylinder bore 46.

After the fuel/air charge is ignited by the spark plug 78, it burns and expands to drive the piston 48 downwardly. Exhaust gases are expelled from the combustion chamber 40 through twin-type exhaust passages 82 that are formed in the cylinder head 50 on a side opposite from the intake passages 54. The exhaust passages 82 extend from a pair of exhaust valve seats 84.

Poppet-type exhaust valves 86 are slidably supported in valve guides 88 that are fixed to and form a part of the cylinder head assembly 88. Coil compression springs 90 act against keeper retainer assemblies 92 on the upper ends of the stems of the exhaust valves 86 to hold them in a closed position.

The exhaust valves 86 are opened and closed by an exhaust camshaft 94 which, like the intake camshaft 72 is journaled in the cylinder head 50 in a known manner. Like the intake camshaft 72, the exhaust camshaft 94 is preferably driven at one-half crankshaft speed by a suitable timing mechanism.

An exhaust manifold 96 is affixed to a side of the cylinder head 50 opposite the induction system 70 and collects the exhaust gases from the exhaust passages 82 and discharges them into an exhaust system for eventual discharge into the atmosphere.

Figure 4:
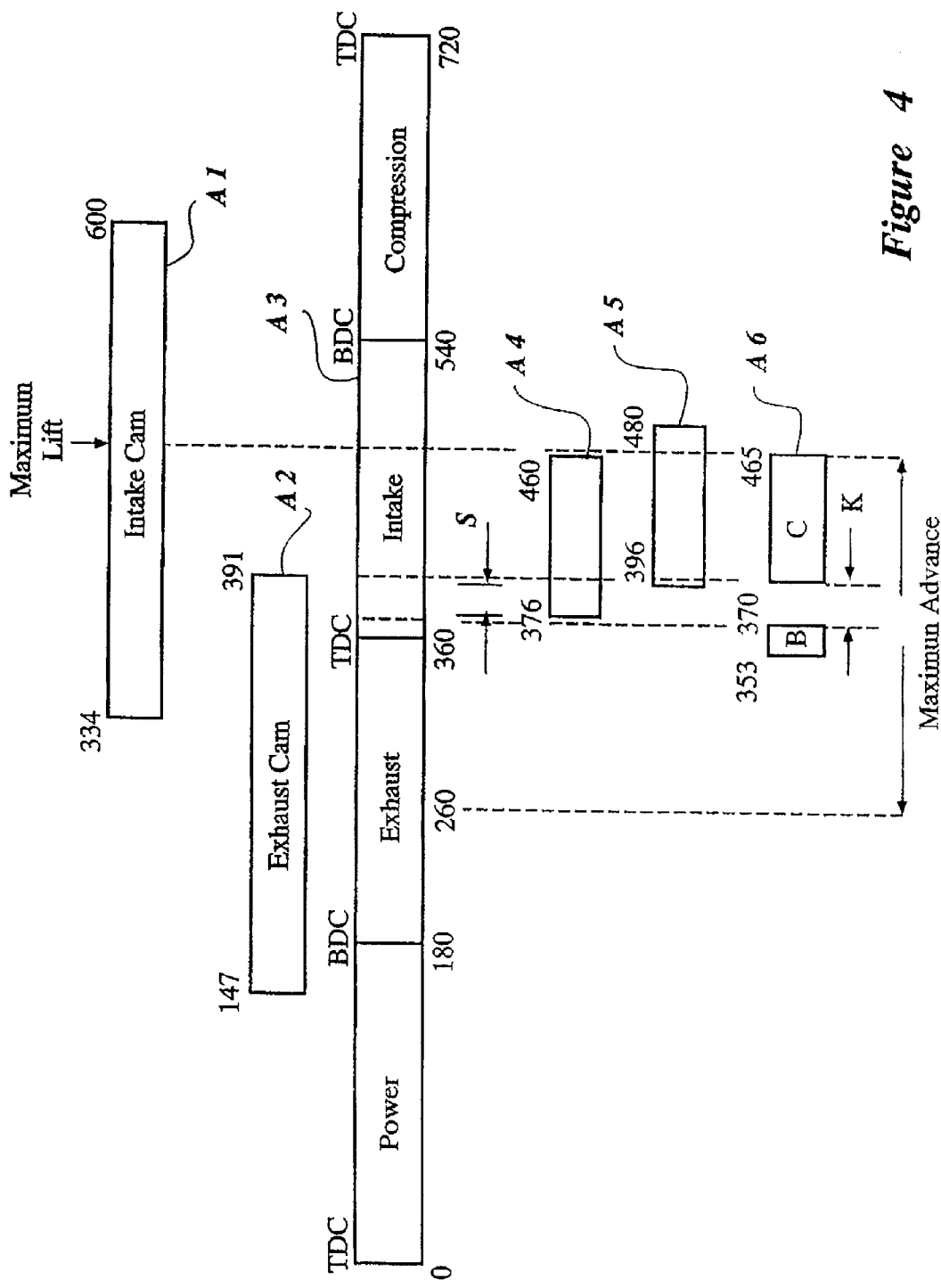
FIG. 4 is a timing diagram showing the valve timing and injection timing according to the prior art and according a preferred embodiment of the present invention.

FIG. 4 is a timing diagram that shows the timing of the intake and exhaust valves 60, 86 for the present engine with respect to the rotational angle of the crankshaft 49. The intake valve timing is indicated by curve A1 while the exhaust valve timing is indicated by curve A2. The crankshaft angle is indicated by curve A3.

In the illustrated embodiment, the intake valves 60 preferably begin to open at approximately 26 degrees before top-dead center (TDC) and remain open until approximately 60 degrees after bottom-dead center (BDC). This intake valve timing is chosen so as to provide relatively high maximum output. As indicated by the curve A2, the exhaust valves 86 are preferably opened approximately 33 degrees before BDC of the power stroke. The exhaust valves 86 remain open until approximately 31 degrees after TDC of the exhaust stroke. It should be appreciated that the intake and exhaust valves 60, 86 overlap from approximately 26 degrees before TDC until approximately 31 degrees after TDC when the exhaust valve 86 closes. It should also be appreciated that the timing curves of the intake and exhaust valves 60, 86 can be modified while the engine 42 is running. This can be accomplished by utilizing a variable valve timing mechanism as is well known in the art.

To achieve the desired results, the present engine unitizes the combustion chamber 40 described above with an injection timing sequence that is illustrated in FIG. 4. However, in order to better understand the advantages of the fuel injection timing of the present engine, the fuel injection timing that is typically used in prior engines will first be described. It should also be appreciated that the injection timing diagram of FIG. 4 illustrates the timing for single cylinder. Those of ordinary skill in the art will recognize how to apply the timing diagram of FIG. 4 to engines with multiple cylinders.

One example of a prior engine injection timing is indicated by curve A4. Fuel injection begins approximately 16 degrees after TDC and ends at approximately 100 degrees after TDC. With this injection timing, fuel is injected within a zone S in which exhaust smoke is likely to be produced. As indicated above, this usually occurs at a range of 10–40 degrees after TDC. In this range, the fuel density is relatively high which tends to produce exhaust smoke. It should be appreciated that the range of crankangles at which exhaust smoke is produced may change depending upon operational state of the engine and the fuel.

Injection timing curve A5 is another example of an injection timing curve. In this case, the fuel injection begins after the exhaust smoke zone S. Accordingly, fuel injection begins at approximately 36 degrees past TDC. This arrangement avoids the exhaust smoke zone S. However, since the beginning of the injection is delayed, the entire duration of the fuel injection is delayed. Accordingly, fuel is injected into the combustion chamber 40 after the intake cam 72 reaches its maximum lift. This is disadvantageous for several reasons. For example, optimal mixing occurs before the intake cam reaches its maximum lift. Therefore, fuel injected after maximum lift is not mixed well with the intake air. This reduces the quality of the combustion and thereby engine power.

The injection timing in accordance with the present engine is indicated by curve A6. As will be explained below, the fuel injection system 75 injects fuel into the combustion chamber 40 in two stages. The first stage begins and ends before an injection prohibited range K. Preferably, the first stage begins before top-dead center of the intake stroke. The second stage begins after the injection prohibited range K. In the illustrated embodiment, the injection prohibited range is approximately 10–40 degrees after TDC of the intake stroke. Accordingly, fuel is not injected during the prohibited range K.

In the illustrated embodiment, the first stage B of the fuel injection begins at approximately 7 degrees before TDC of the intake stroke and continues until about 10 degrees after TDC of the intake stroke (i.e., the start of the injection prohibited range K). Because the fuel injectors 72 inject downwardly toward the head 52 of the piston 48, the fuel will tend to be deposited on the top surface 52 of the piston 48. The flow of air over the top surface 52 will then cause the fuel to move gradually toward the exhaust side of the combustion chamber 40. Thus, even though the exhaust valves 86 are still open, the fuel will not migrate to a position where it will be mixed to any significant degree with exhaust gases. Accordingly, the fuel will remain in the combustion chamber 40.

Furthermore, as schematically illustrated in FIG. 3, the fuel is injected substantially equally across at least a substantial portion of the top surface 52 of the piston 48. That is, the spray patterns covers a substantially large area of the top surface 52 of the piston 48. This promotes equal vaporization of the fuel due to the heat of the remaining exhaust gases and the of the top surface 52 of the piston. If the top surface 52 of the piston 48 is coated with ceramic, the vaporization of the fuel is further promoted. Accordingly, the production of exhaust smoke is reduced. The equal vaporization of the fuel also cools the intake air, which inhibits knocking. Accordingly, an engine 42 according to the present engine can be operated at a higher compression ratio, which further increases the power output of the engine. In comparison, in the prior engine of FIG. 1, the stratified charge inhibits the equal vaporization of the fuel.

In the illustrated embodiment, during the first fuel injection period, the intake valves 60 and exhaust valves 82 are preferably both open. The air from the intake valves 60 sweeps the injected fuel across and away from the exhaust valve 82. This arrangement also helps to prevent the fuel from exiting the combustion chamber 40 through the exhaust valve 80 and also heats the fuel.

The first fuel injection period B ends at approximately 10 degrees after TDC of the intake stroke. Accordingly, fuel is not injected into the combustion chamber 40 the prohibited range K. Therefore, the production of exhaust smoke is further reduced. The second stage C of fuel injection begins at approximately 40 degrees after TDC of the intake stroke and continues until approximately 105 degrees after TDC. Preferably, the end of the second stage C matches the point of maximum lift of the intake cam 72. Accordingly, the fuel is injected into the combustion chamber 40 during a time when mixing is maximized.

After the fuel has been injected into the combustion chamber 40, the piston 48 begins to rise. The compression and squish action tends to cause a rich fuel/air mixture to converge at the spark plug 57 so that the fuel/air mixture can be burned even if there is an overall lean mixture in the combustion chamber.

It should be appreciated that the duration that the fuel injector 72 is open is approximately the same for all three injection curves A4, A5, A6 described above. This means that the total amount of fuel injected with the present engine is relatively close to the prior art. However, with the present engine the amount of exhaust smoke is reduced because the fuel is not injected into the combustion chamber during the prohibited range K. Another advantage of the present engine is that the mixing of the fuel and air is maximized because the injection duration is competed before the intake cam 72 reaches its maximum lift.

Figure 5:
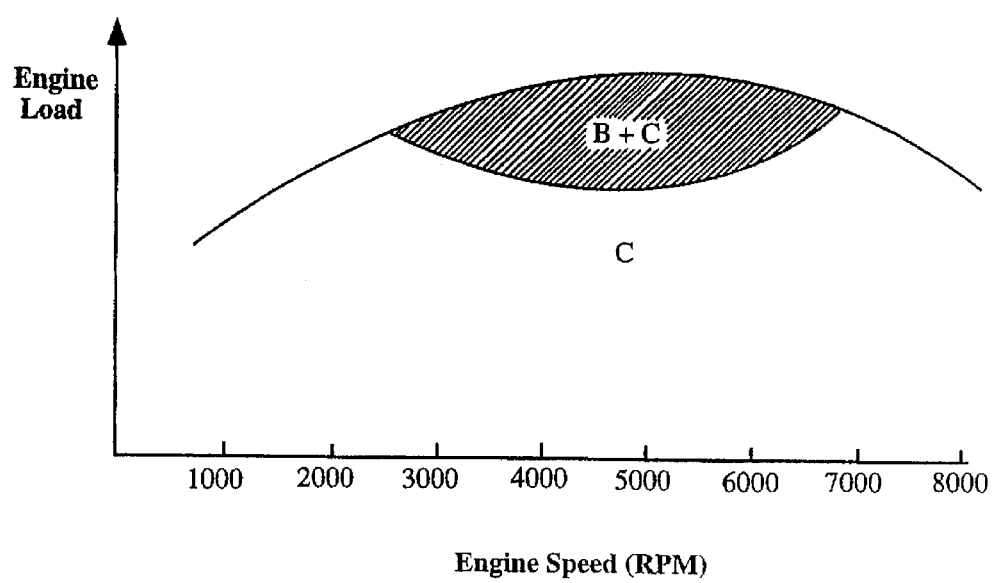
FIG. 5 is a graphical representation of the relationship between engine speed and load in an engine utilizing the injection timing represented by FIG. 4.

The effects of the injection curve A6 of the present engine on engine performance are shown in FIG. 5. In this figure, engine load is plotted versus engine speed during full throttle conditions. When the engine load is low, fuel can be injected only during the second stage C. When the engine load is increased, the fuel can be injected during the first and second stages B, C. Accordingly, the torque of the engine 42 can be increased as indicated by the shaded region of the graph. Therefore, in an engine according to the present engine, an increase in torque can be achieved without substantially increasing the amount of exhaust smoke.

Figure 6:
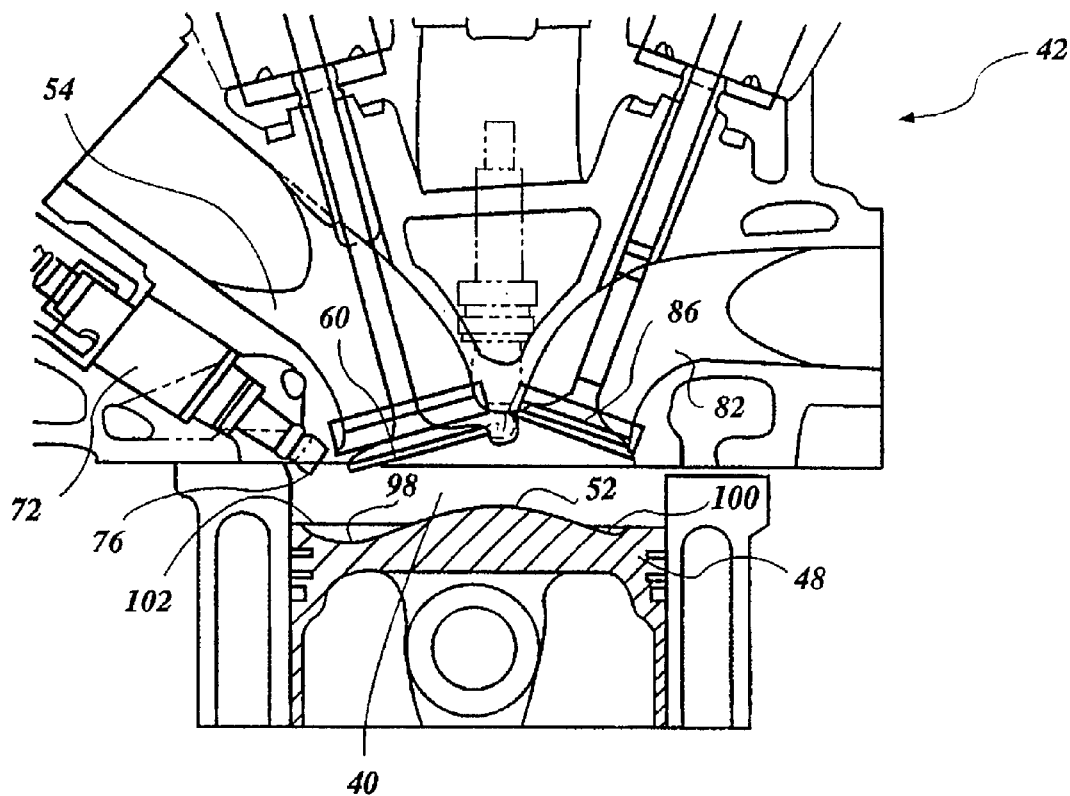
FIG. 6 is a partially cross-sectional view a taken through a single piston, cylinder and cylinder head constructed in accordance with another embodiment of the invention.
Figure 7:
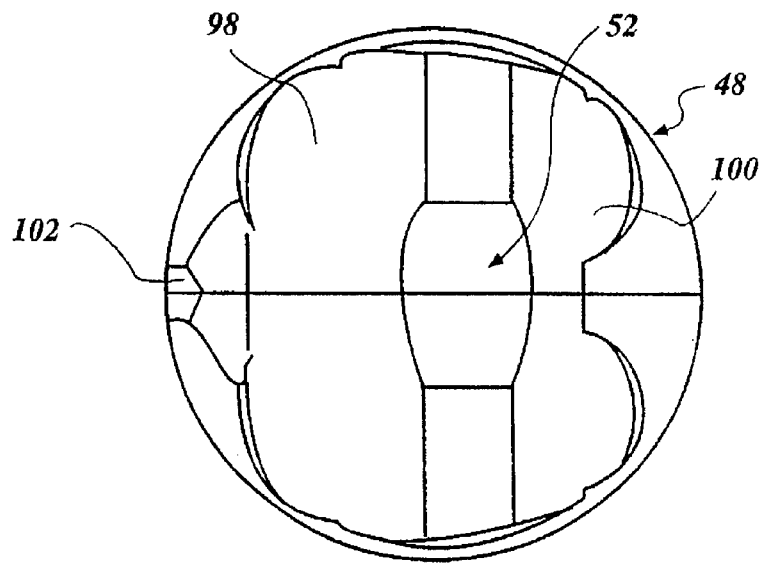
FIG. 7 is a top plan view of the piston of FIG. 6.

FIGS. 6 and 7 show another preferred embodiment of an engine 42 according the present invention. This embodiment is very similar to the previous embodiment. Accordingly, similar components have been given the same reference numbers. The main difference between this embodiment and the first embodiment is the configuration of the piston 48.

As seen in FIGS. 6 and 7, the top surface 52 of the piston 48 includes an intake valve recess 98 and an exhaust valve recess 100. These recesses 98, 100 provide clearance for the intake and exhaust valves 60, 86 respectively. The top surface 52 of the piston 48 also includes a recess 102 for the fuel injector nozzle tip 76. The clearances provided by the intake recess, exhaust valve recess and fuel injector recess 102 prevents the top surface 52 of the piston 48 from contacting the intake valve 60, exhaust valve 86 and fuel injector 72. Accordingly, the top dead center position of the piston 38 can be elevated, which increases the compression ration of the engine 42.

As mentioned above, the injection timing described above and the configuration of the combustion chamber 40 allow for higher compression ratio by inhibiting knocking. Specifically, because the fuel is equally vaporized, the intake air is sufficiently cooled, and early combustion is prevented. Furthermore, the preferentially oxidization of the hydrocarbons is reduced, thereby, inhibiting the production of exhaust smoke.

For purposes of describing the invention and the advantages achieved over the prior art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Furthermore, although this invention has been disclosed in the context of certain preferred embodiments and examples, it will be understood by those skilled in the art that the present engine extends beyond the specifically disclosed embodiments to other alternative embodiments and/or uses of the invention and obvious modifications and equivalents thereof. Thus, it is intended that the scope of the present engine herein disclosed should not be limited by the particular disclosed embodiments described above, but should be determined only by a fair reading of the claims that follow.

What is claimed is:

1. An internal combustion engine comprising an engine body assembly defining at least one cylinder closed at one end, at least one piston reciprocating within the cylinder, at least one combustion chamber formed within the engine body assembly by the cylinder, the closed end of the cylinder and the piston, the piston having a head that faces the closed end of the cylinder, the piston being coupled to an output shaft such that movement of the reciprocating movement of the piston causes the output shaft to rotate, a fuel injector arranged to supply fuel to the combustion chamber, the fuel injector including an actuator to control a flow of fuel through the fuel injector, and a fuel control system coupled to the actuator and configured to control the actuator so as to not inject fuel into the combustion chamber when the output shaft is within prohibited shaft angle range that is located past a top-dead-center position, the fuel control system is also configured to control the fuel injector to inject fuel into the combustion chamber after the prohibited shaft angle range when the engine is operating under a first load condition and to inject fuel into the combustion chamber before and after the prohibited shaft angle range under a second load condition, the second load condition being greater than the first load condition.

2. An internal combustion engine as set forth in claim 1, wherein the internal combustion engine further includes an intake valve to regulate the flow of intake air into the combustion chamber and the fuel control system is configured to cease fuel injection into the combustion chamber when the intake valve is moved to about a maximum lift position.

3. An internal combustion engine as set forth in claim 1, wherein the prohibited shaft angle range is approximately 10 degrees to 40 degrees after the second member reaches the top-dead-center position during an intake stroke.

4. An internal combustion engine as set forth claim 1, wherein the piston head has a substantially flat surface.

5. An internal combustion engine as set forth in claim 4, wherein the substantially flat surface of the piston head is covered with a ceramic coating.

6. An internal combustion engine as set forth in claim 4, wherein the fuel injector has a spray pattern that covers a substantial portion of the piston head flat surface.

7. An internal combustion engine operating on a four-stroke cycle and comprising an engine body assembly defining at least one cylinder closed at one end, a piston reciprocating within the cylinder, at least one combustion chamber formed within the engine body assembly by the cylinder, the closed end of the cylinder and the piston, the piston having a head that faces at least one intake port and at least one exhaust port, the piston being coupled to an output shaft such that movement of the reciprocating movement of the piston causes the output shaft to rotate, an intake valve opening and closing during each cycle to regulate the flow of intake are into the combustion chamber, a fuel injector that supplies fuel to the combustion chamber, the fuel injector including an actuator to control a flow of fuel through the fuel injector, and a fuel control system coupled to the actuator and configured to inject fuel into the combustion chamber in at least a first stage and a second stage during each cycle, the first and second stages separated by a rest period, the first and second stages being completed before the intake valve closes during each cycle, the first stage beginning before the piston reaches a top-dead-center position of the intake stroke, and the second stage beginning after the piston reaches a top-dead-center position of the intake stroke.

8. An internal combustion engine as set forth in claim 7, wherein the rest period corresponds to a period of an intake stroke of each cycle during which hydrogen molecules are preferentially oxidized.

9. An internal combustion engine as set forth in claim 7, wherein the rest period occurs between about 10 degrees and about 40 degrees after the piston reaches the top-dead-center position of the intake stroke.

10. An internal combustion engine as set forth in claim 7, wherein the second stage ends when the intake valve is lifted approximately to a maximum degree.

11. An internal combustion engine as set forth claim 7, wherein the piston head has a substantially flat surface.

12. An internal combustion engine as set forth in claim 11, wherein the substantially flat surface of the piston head is covered with a ceramic coating.

13. An internal combustion engine as set forth in claim 11, wherein the fuel injector has a spray pattern that covers a substantial portion of the piston head flat surface.

14. An internal combustion engine operating on a four-stroke cycle and comprising an engine body assembly defining at least one cylinder closed at one end, at least one piston reciprocating within the cylinder, at least one combustion chamber formed within the engine body assembly by the cylinder, the closed end of the cylinder and the piston, the piston having a head that faces the closed end of the cylinder, the piston being coupled to an output shaft such that movement of the reciprocating movement of the piston causes the output shaft to rotate, a fuel injector that supplies fuel to the combustion chamber, the fuel injector including an actuator to control a flow of fuel through the fuel injector, and a fuel control system coupled to the actuator and configured to inject fuel into the combustion chamber in at least a first stage beginning before the piston reaches a top-dead-center position of an intake stroke and to inject fuel into the combustion chamber in at least a second stage, the second stage beginning after the piston reaches the top-dead-center position of the intake stroke.

15. An internal combustion engine as set forth in claim 14, wherein the first and second stages are separated by a rest periods.

16. An internal combustion engine as set forth in claim 15, wherein the rest period occurs between about 10 degrees and about 40 degrees after the piston reaches the top-dead-center position of the intake stroke.

17. An internal combustion engine according to claim 14, wherein the internal combustion engine further includes an intake valve for regulating the flow of intake air into the combustion chamber and the second stage ends when the intake valve is displaced to about a maximum degree of lift.

18. An internal combustion engine as set forth claim 14, wherein the piston head has a substantially flat surface.

19. An internal combustion engine as set forth in claim 18, wherein the substantially flat surface of the piston head is covered with a ceramic coating.

20. An internal combustion engine as set forth in claim 18, wherein the fuel injector has a spray pattern that covers a substantial portion of the piston head flat surface.

21. A method for operating an internal combustion comprising reciprocating a piston within a cylinder of the engine through power, exhaust, intake and compression strokes of repeating combustion cycles, injecting fuel into a combustion chamber, which is formed within the cylinder, during a first injection stage during each cycle, ceasing fuel injection during a rest period occurring within the intake stroke, and injecting fuel into the combustion chamber during a second stage after the rest period, the first stage beginning before the piston reaches a top-dead-center position of the intake stroke.

22. A method according to claim 21, wherein injecting fuel into the combustion chamber during the first stage begins before the piston reaches a top-dead-center position of the intake stroke.

23. A method according to claim 21, wherein injecting fuel into the combustion chamber during the second stage begins after the piston reaches a top-dead-center position of the intake stroke.

24. A method according to claim 23, wherein injecting fuel in to the combustion chamber during the first stage begins before the piston reaches a top-dead-center position of the intake stroke.

25. A method according to claim 21, wherein ceasing fuel injection during the rest period occurs when an output shaft of the engine rotates from about 10 degrees to about 40 degrees after the piston reaches the top-dead-center position of the intake stroke.

26. A method according to claim 21, wherein injecting fuel during at least one of the first and second stages involves spaying fuel over a substantial portion of a head of the piston.

27. An internal combustion engine comprising an engine body assembly defining at least one cylinder closed at one end, at least one piston reciprocating within the cylinder, at least one combustion chamber formed within the engine body assembly by the cylinder, the closed end of the cylinder and the piston, the piston having a head that faces the closed end of the cylinder, the piston being coupled to an output shaft such that movement of the reciprocating movement of the piston causes the output shaft to rotate, a fuel injector arranged to supply fuel to the combustion chamber, the fuel injector including an actuator to control a flow of fuel through the fuel injector, and a fuel control system coupled to the actuator and configured to control the actuator so as to not inject fuel into the combustion chamber when the output shaft is within a prohibited shaft angle range that is located past a top-dead-center position, the prohibited shaft angle range corresponding to a range of shaft angles through an intake stroke during which high fuel densities produce exhaust smoke.

28. An internal combustion engine as set forth in claim 27, wherein fuel is injected into the combustion chamber before the prohibited shaft angle range.

29. An internal combustion engine as set forth in claim 27, wherein the fuel control system is configured to control the fuel injector to inject fuel into the combustion chamber after the prohibited shaft angle range when the engine is operating under a first load condition and to inject fuel into the combustion chamber before and after the prohibited shaft angle range under a second load condition, the second load condition being greater than the first load condition.

30. An internal combustion engine as set forth in claim 27, wherein the internal combustion engine further includes an intake valve to regulate the flow of intake air into the combustion chamber and the fuel control system is configured to cease fuel injection into the combustion chamber when the intake valve is moved to about a maximum lift position.

31. An internal combustion engine as set forth in claim 27, wherein the prohibited shaft angle range is approximately 10 degrees to 40 degrees after the second member reaches the top-dead-center position during an intake stroke.

32. An internal combustion engine as set forth claim 27, wherein the piston head has a substantially flat surface.

33. An internal combustion engine as set forth in claim 32, wherein the substantially flat surface of the piston head is covered with a ceramic coating.

34. An internal combustion engine as set forth in claim 32, wherein the fuel injector has a spray pattern that covers a substantial portion of the piston head flat surface.

35. An internal combustion engine comprising an engine body assembly defining at least one cylinder closed at one end, at least one piston reciprocating within the cylinder, at least one combustion chamber formed within the engine body assembly by the cylinder, the closed end of the cylinder and the piston, the piston having a head that faces the closed end of the cylinder, the piston being coupled to an output shaft such that movement of the reciprocating movement of the piston causes the output shaft to rotate, a fuel injector arranged to supply fuel to the combustion chamber, the fuel injector including an actuator to control a flow of fuel through the fuel injector, and a fuel control system coupled to the actuator and configured to control the actuator so as to not inject fuel into the combustion chamber when the output shaft is within a prohibited shaft angle range that is located past a top-dead-center position and is approximately 10 degrees to 40 degrees after the second member reaches the top-dead-center position during an intake stroke.

36. An internal combustion engine as set forth in claim 35, wherein fuel is injected into the combustion chamber before the prohibited shaft angle range.

37. An internal combustion engine as set forth in claim 35, wherein the fuel control system is configured to control the fuel injector to inject fuel into the combustion chamber after the prohibited shaft angle range when the engine is operating under a first load condition and to inject fuel into the combustion chamber before and after the prohibited shaft angle range under a second load condition, the second load condition being greater than the first load condition.

38. An internal combustion engine as set forth in claim 35, wherein the internal combustion engine further includes an intake valve to regulate the flow of intake air into the combustion chamber and the fuel control system is configured to cease fuel injection into the combustion chamber when the intake valve is moved to about a maximum lift position.

39. An internal combustion engine as set forth claim 35, wherein the piston head has a substantially flat surface.

40. An internal combustion engine as set forth in claim 39, wherein the substantially flat surface of the piston head is covered with a ceramic coating.

41. An internal combustion engine as set forth in claim 39, wherein the fuel injector has a spray pattern that covers a substantial portion of the piston head flat surface.

* * * * *

UNITED STATES PATENT AND TRADEMARK OFFICE
CERTIFICATE OF CORRECTION

PATENT NO. : 6,532,933 B1
DATED : March 18, 2003
INVENTOR(S) : Tanaka et al.

It is certified that error appears in the above-identified patent and that said Letters Patent is hereby corrected as shown below:

<u>Title page,</u>
Item [30], change "10-067654" to -- 11-067654 --.

Signed and Sealed this

Second Day of September, 2003

JAMES E. ROGAN
*Director of the United States Patent and Trademark Office*